(12) United States Patent
Holung

(10) Patent No.: US 6,921,056 B2
(45) Date of Patent: Jul. 26, 2005

(54) MECHANICAL ARM AND COUNTERBALANCE ASSEMBLY

(75) Inventor: Joseph Anthony Holung, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/606,852

(22) Filed: Jun. 26, 2003

(65) Prior Publication Data

US 2004/0262476 A1 Dec. 30, 2004

(51) Int. Cl.$^7$ ................................................ E04G 3/00
(52) U.S. Cl. ........................... 248/280.11; 248/162.1; 248/279.1; 248/286.1; 248/404
(58) Field of Search .................. 74/110, 99 R, 74/100.1; 248/280.11, 279.1, 281.11, 285.1, 286.1, 287.1, 297.11, 162.1, 404, 183.3, 372.1, 571, 565, 564

(56) References Cited

U.S. PATENT DOCUMENTS

| | | | |
|---|---|---|---|
| 4,065,994 A | | 1/1978 | Streit |
| 4,090,685 A | * | 5/1978 | Pappas ........................ 246/125 |
| 4,160,536 A | | 7/1979 | Krosgrud |
| 4,557,459 A | | 12/1985 | Lindsay |
| 4,815,832 A | | 3/1989 | Nagano et al. |
| 4,846,434 A | | 7/1989 | Krosgrud |
| 4,849,778 A | * | 7/1989 | Samuelson ................... 396/428 |
| 4,943,019 A | * | 7/1990 | Mester ................... 248/123.11 |
| 5,415,057 A | * | 5/1995 | Nihei et al. ............... 74/490.01 |
| 5,697,757 A | * | 12/1997 | Lindsay .................... 414/744.6 |
| 6,334,595 B1 | * | 1/2002 | Stenkvist et al. ......... 248/125.2 |
| 6,345,919 B1 | * | 2/2002 | Chapman .................... 396/428 |
| 6,543,914 B2 | * | 4/2003 | Sander ........................ 362/401 |

* cited by examiner

Primary Examiner—Ramon O. Ramirez
Assistant Examiner—Amy Sterling
(74) Attorney, Agent, or Firm—Joseph P. Lally; Martin J. McKinley

(57) ABSTRACT

A mechanical assembly includes an arm and an extension link that rotate about a pivot point, a yoke, and a force generating device. The yoke includes a first slot in which a pin of the link resides. The yoke translates in a plane responsive to rotation of the counterbalance extension link pin about the pivot point. The force generating device is connected between the counterbalance extension link pin and a fixed point on the yoke to exert a force on the counterbalance extension link pin. The orientation and magnitude of the force produced by the force generating device remains constant as the yoke translates. The force generating device and extension link produce a torque that is equal and opposing to the torque produced by the force of gravity acting on the arm so that the arm is in static equilibrium. The static equilibrium condition is independent of the rotational position of the arm.

7 Claims, 5 Drawing Sheets

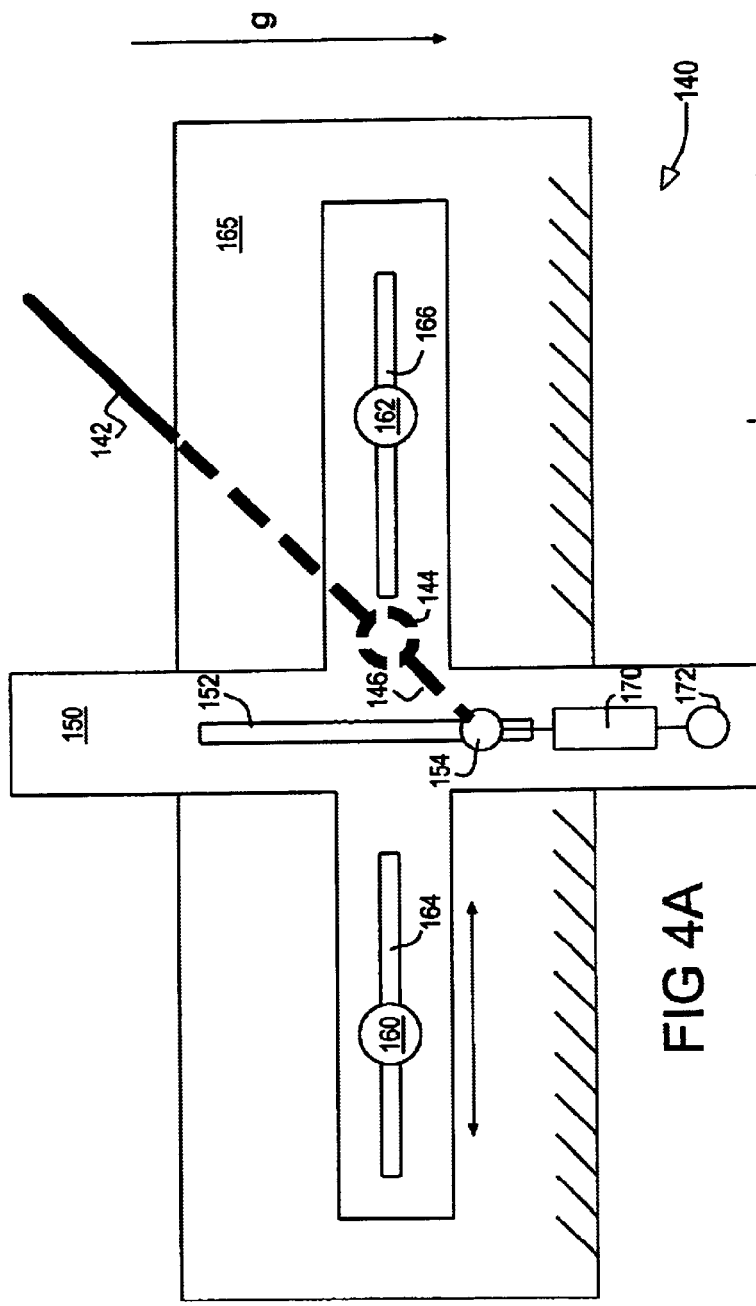
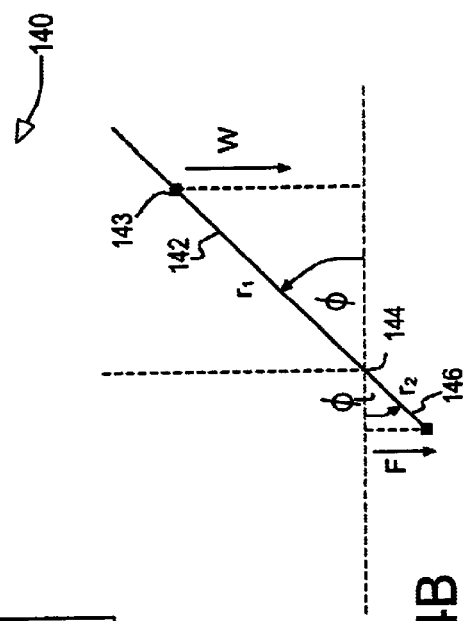
FIG 4A
FIG 4B

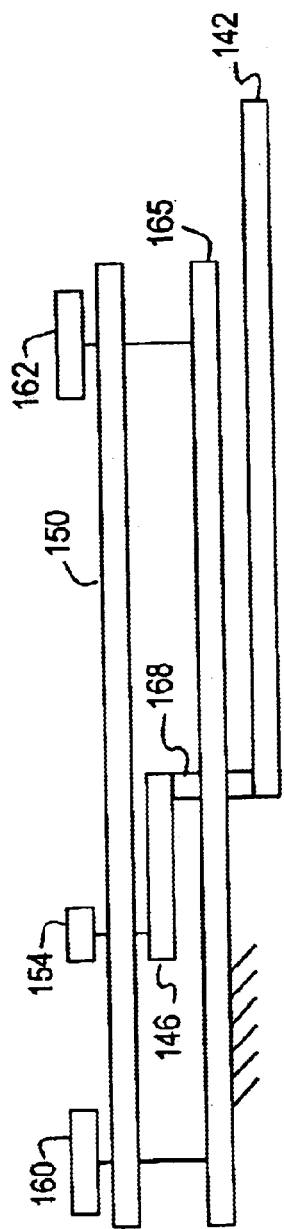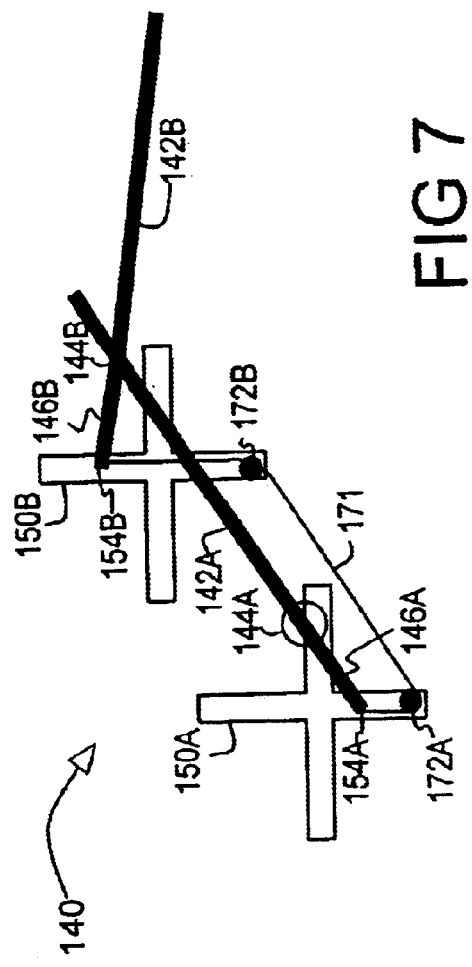

MECHANICAL ARM AND COUNTERBALANCE ASSEMBLY

BACKGROUND

1. Field of the Present Invention

The present invention is in the field of mechanical devices and more particularly in the field of counterbalanced mechanical arms or extension.

2. History of Related Art

In the field of mechanical systems, mechanisms for counterbalancing a rotating or pivoting arm are found in a wide variety of applications from construction equipment to computer displays. Referring to FIG. 1, an illustration of fundamental counterbalancing concepts is presented. In FIG. 1, a mechanical member or arm 102 is fixed to a pivot point 104. The pivot point 104 is used to define the origin of a Cartesian coordinate system that defines the plane within which mechanical arm 102 is free to rotate. In this illustration, the force of gravity (g) is shown as a vector pointing in the $-y$ direction. For purposes of determining the movement or torque exerted about the pivot point 104 by mechanical arm 102, the arm can be represented as a point mass 106 having a weight of W and positioned at a distance of $r_1$ from pivot point 104. Mechanical arm 102 is free to pivot about pivot point 104. The position of mechanical arm 104 is described by the angle $\phi$. Quantitatively, the movement exerted on the pivot point 104 by arm 102 is $r_1 * \cos(\phi) * W$.

Counterbalancing mechanical arm 102 is achieved in FIG. 1 by providing a counterbalance weight 112 and a counterbalance extension 110 that extends from pivot point 104 collinear with arm 102. Counterbalance weight 112 has a weight C and is located a distance $r_2$ from pivot point 104. Counterbalancing is achieved when the movement exerted about pivot point 104 is equal in magnitude and opposite in direction from the movement exerted by mechanical arm 102. Quantitatively, this state is achieved when $r_2 \cos(\phi)C = r_1 \cos(\phi)W$ or $r_2 C = r_1 W$. Unfortunately achieving this type of counterbalancing requires the addition of an undesirably long extension piece 110, undesirable additional weight C, or both.

An attempt to address the undesirable weight and size of the counterbalance approach of FIG. 1 is illustrated in FIG. 2. In this counterbalance system, a torsional spring 120 is attached to mechanical arm 102 to produce a counteractive movement on mechanical arm 102. This approach limits the arc in which mechanical arm 102 is free to move and may be balanced in just one or two locations as the force exerted by spring 120 varies with the position of the arm. Another commonly encountered configuration, as depicted in FIG. 3, employs a linear spring 130 connected between an extension piece 132 of arm 102 and a fixed point to produce a force on the arm. This approach also undesirably limits the movement of mechanical arm 102 and produces a force that only counterbalances the mechanical arm in just one or two positions. It would be desirable to implement a mechanism and assembly that would enable the counterbalancing of a mechanical arm. It would be further desirable if the implemented mechanism permitted complete freedom of movement of the mechanical arm. It would be still further desirable if the implemented solution was statically balanced independent of the position of the mechanical arm.

SUMMARY OF THE INVENTION

The objectives identified above are achieved by a counterbalancing assembly according to the present invention. The assembly includes a mechanical arm connected to a fixed point about which the arm can pivot. A first end of a counterbalance link is also pivotally connected to the pivot point while a second end of the counterbalance link includes a pin. The counterbalance pin engages a first slot in a yoke device. The first slot is oriented in a first direction, which is typically either horizontal (0°) or vertical (90°). The yoke device includes second and third slots oriented perpendicularly with respect to the first slot. The second and third slots engage fixed position pins that restrict the motion of the yoke mechanism. The counterbalance pin is connected to a first end of a force generating apparatus such as a spring. The spring is preferably a constant force spring that produces a force that is substantially independent of the spring's displacement. A second end of the force generating apparatus is connected to the yoke wherein the force generating mechanism is oriented in the direction of the first slot. The yoke slots, in conjunction with the constant force spring, produce a force on the counterbalance pin that does not vary, in magnitude or direction, with the rotational position of the counterbalance extension. By adjusting the dimensions of the counterbalance extension and the force produced by the force generating apparatus, the assembly produces a torque or movement on the pivot point that counteracts the movement produced by the force of gravity acting on the mechanical arm regardless of the rotational position of the mechanical arm. The mechanical arm and counterbalance link may be collinear or perpendicular to each other depending upon the implementation. Additional mechanical arm and counterbalance extension links may be connected to the first mechanical arm to produce a multi-segmented or articulated mechanical structure that remains statically balanced independent of the rotational position of any of the mechanical arm segments. In one embodiment, the counterbalanced, multi-segment structure is achieved with a single spring.

BRIEF DESCRIPTION OF THE DRAWINGS

Other objects and advantages of the invention will become apparent upon reading the following detailed description and upon reference to the accompanying drawings in which:

FIG. 4A illustrates selected elements of a counterbalance assembly according to one embodiment of the invention;

FIG. 4B is a graphical illustration of the prevailing forces in the assembly of FIG. 4A;

FIG. 6 is a detailed side view of the assembly of FIG. 4A or 5A;

FIG. 7 is a conceptual illustration of a multi-segment embodiment of the invention.

Figure 1:
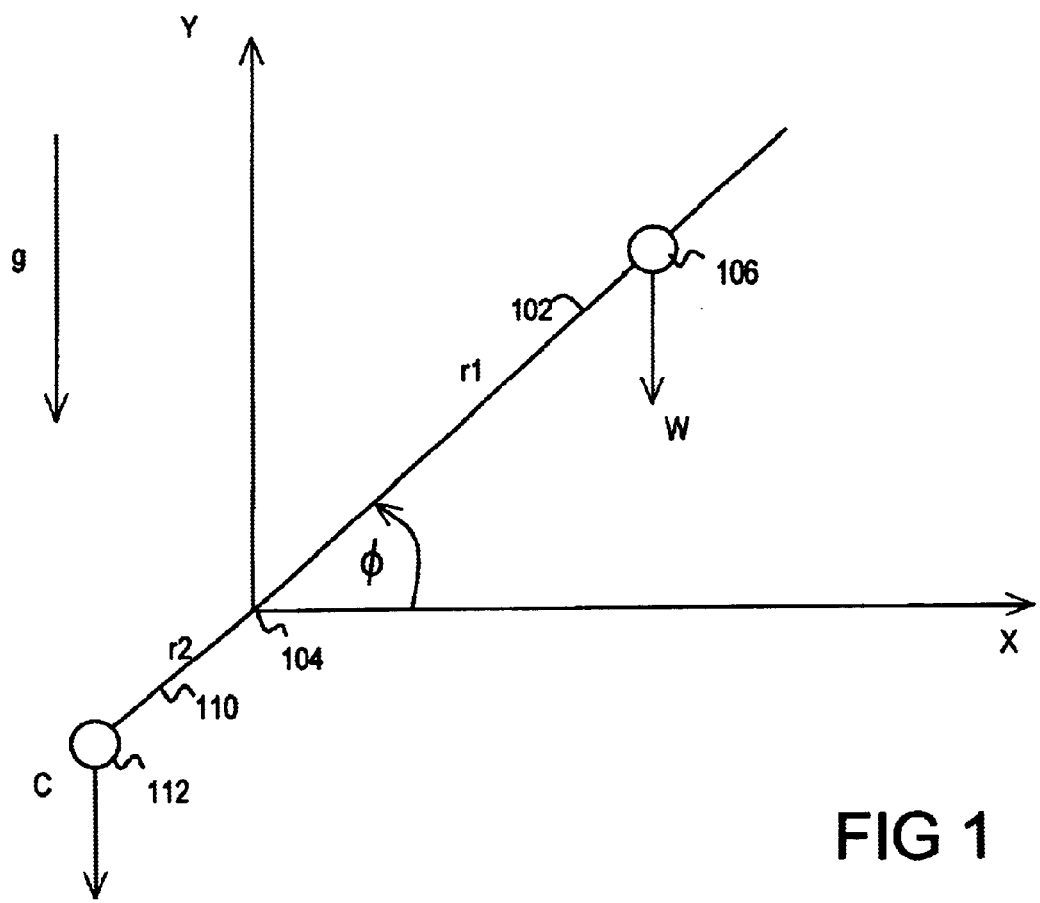
FIG. 1 is a conceptual illustration of static balance achieved using a counterbalance weight.
Figure 2:
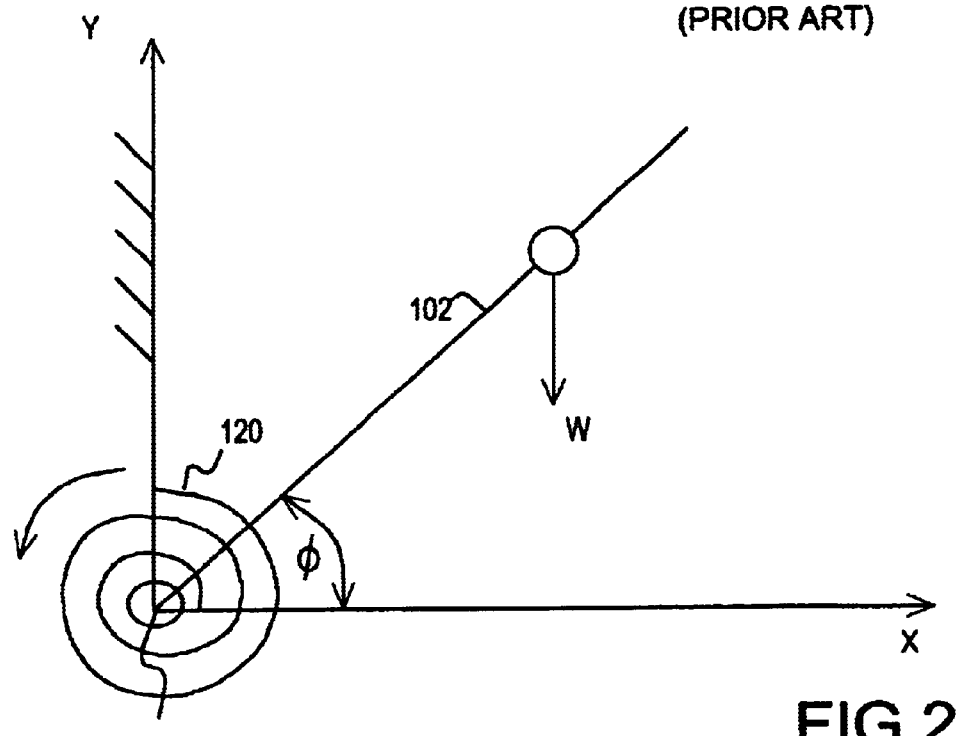
FIG. 2 illustrates a torsional spring counterbalance assembly according to the prior art.
Figure 3:
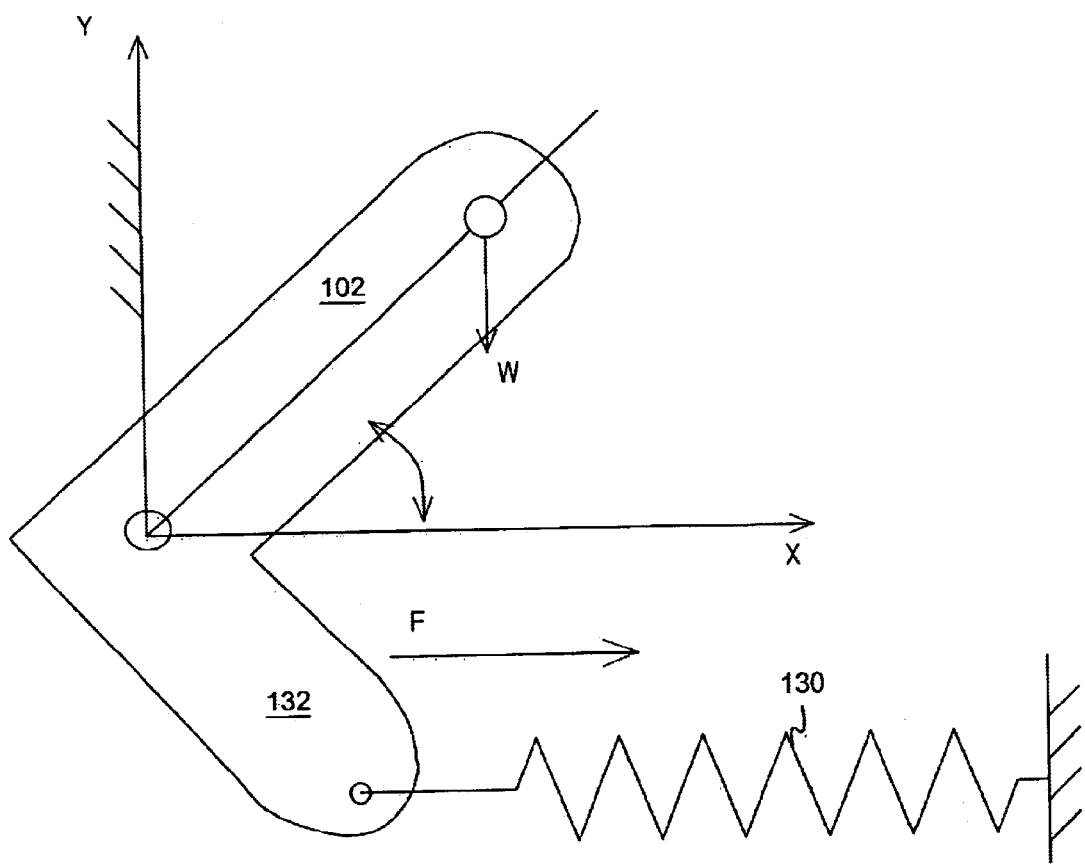
FIG. 3 illustrates a linear spring counterbalance assembly according to the prior art.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the present invention contemplates a mechanism that provides a substantially constant counterbalancing torque to a mechanical arm free to pivot about a pivot point. A counterbalancing extension link is connected to the pivot point. The orientation of the mechanical arm to the extension link is fixed. A force that is substantially constant in both magnitude and direction is applied to the free end of the extension link. The force is substantially invariant with the rotational positions of the extension link and mechanical arm. The magnitude of the constant force is determined by the length of the extension link and the torque on the pivot pin attributable to the mechanical arm to produce a counterbalancing torque on the pivot pin that maintains the mechanical arm in a state of static equilibrium without restricting the arc in which the arm is free to move.

Referring now to FIGS. 4A and 4B, a counterbalance assembly 140 according to one embodiment of the invention is depicted. In the depicted embodiment, counterbalance assembly includes a mechanical arm 142 attached to and free to rotate about a pivot point 144. In the orientation of FIG. 4A, the force of gravity has a downward direction. Assembly 140 further includes a counterbalance extension link 146 that is also connected to pivot point 144. Extension link 146 and mechanical arm 142 as depicted in FIG. 4A are collinear such that, as observed in the view of FIG. 4A, mechanical arm 142 and extension link 146 form a straight line.

The assembly 140 as depicted further includes a yoke 150 that includes a first slot 152 having a vertical orientation. A pin 154 affixed to a free end of extension link 146 is engaged or otherwise located within first slot 152. The pin 154 is free to move within slot 152 as the mechanical arm is rotated about pivot point 144.

Yoke 150 is constrained to move in a single direction, which is perpendicular to the orientation of first slot 152 as the link pin 154 rotates about pivot point 144. In the depicted embodiment, yoke 150 is constrained to move in the +/− x-direction by first and second constraining pins 160 and 162 which attach to a fixed reference 165 through second and third slots 164 and 166, respectively, in yoke 150. In this embodiment, the position in the x-direction of yoke 150 tracks the x-direction position of link pin 154 as it rotates about pivot point 144. As depicted in FIG. 4A, slots 164 and 166 are oriented perpendicular to first slot 152. In other embodiments, the means for constraining the movement of yoke 150 may include, for example, a bearing and track assembly (not shown) in which a fixed position track constrains the direction of motion for yoke 150. Yoke 150 is displaced from the underlying fixed reference 165 by a set of spacer devices (not shown).

As shown in the side view detail of FIG. 6, mechanical arm 142 is preferably positioned on the first side of fixed reference 165 while extension link 146 and yoke 150 are positioned on the other side. In this configuration, mechanical arm 142 is free to rotate through a full 360° arc without interference. FIG. 6 also illustrates a pin 168 that links mechanical arm 142 and extension link 146. In the preferred embodiment, mechanical arm 142 and extension link 146 are rigidly affixed to linking pin 168 such that the angle defined by mechanical arm 142 and extension link 146 is constant. Linking pin 168 is free to rotate within a hole in fixed reference 165 in which the pin is engaged.

Returning to FIGS. 4A and 4B, assembly 140 includes a force generating device 170 connected between the extension link pin 154 and a fixed pin 172 in yoke 150. In the depicted embodiment, force generating device 170 is oriented to exert a downward force on extension link pin 154. It will be appreciated that, as mechanical arm 142 is rotated about pivot point 144, extension link pin 154 also rotates about the pivot. As extension link pin 154 rotates about the pivot, yoke 150 translates in the +/− x-direction (horizontally) to maintain the position of yoke pin 172 directly below the extension link pin 154 and thereby maintain the orientation of force generating device 170. In this manner, yoke 150 maintains the direction of the force exerted by force generating device 170 in a constant direction such that the direction of the force is independent of the rotational position or angle of mechanical arm 142 or extension link 146.

In the preferred embodiment, force generating device 170 is implemented with a constant force spring. As its name implies, a constant force spring is a device that exerts a force that is substantially invariant with spring displacement, at least within a specified range of displacement. If such a constant force spring is constrained by the implementation to maintain its displacement within the substantially constant force range, the corresponding force generating device may be characterized as a constant force generating device.

The combination of the constant force device 170 and the yoke 150, which provides a constant direction mechanism, it will be appreciated that assembly 140 maintains a force on extension pin 154 that is constant in both magnitude and direction. The force of gravity, likewise, provides a constant force on a center of mass 143 of arm 142. These two forces produce countervailing torques about pivot point 144. By manipulating the value of force generated by constant force spring 170 and the dimension (length) of counterbalance extension link 146, the torque attributable to counterbalance extension link 146 and the torque attributable to the force of gravity acting on arm 142 may be made to be equal in magnitude and opposite in direction such that the two forces counterbalance each other such that the mechanical arm is in static equilibrium.

Referring to FIG. 4B, the relevant forces at work in assembly 140 are graphically illustrated to emphasize that the static equilibrium condition described above is not dependent upon the rotational position of the mechanical arm. With mechanical arm 142 forming the angle φ with respect to the x-axis and the mechanical arm's center of mass point 143 being located a distance $r_1$ from the pivot point 144, it can be trivially determined that the movement about pivot point 144 caused by mechanical arm 142 is $r_1*\cos(\phi)*W$. Similarly, it can be readily shown that collinear counterbalance extension link 146 forms the angle φ with the x-axis and that the movement about pivot point 144 caused by the action of force generating device 170 on counterbalance extension link pin 154 is $r_2*\cos(\phi)F$ where $r_2$ is the length of counterbalance extension link 146 and F is the magnitude of the force created by force generating device 170 (ignoring as inconsequential, or perhaps adjusting for the weight of counterbalance extension link 146 itself). The sum of torques is thus equal to $r_1*\cos(\phi)W - r_2*\cos(\phi)F$ and equilibrium is achieved by setting $r_2F = r_1 W$. The most significant feature regarding this equality is the absence of the rotational angle φ. Thus, the equality is true for any value of φ (i.e., any position of the arm). Thus, assembly 140 as depicted in FIG. 4A, includes a yoke 150 that enables a force producing device to apply a force that is constant in magnitude and direction to a point that is rotating about a pivot point.

The force generating device 170 may be implemented with a constant force spring as described above. In one embodiment, the constant force spring includes a long and thin rectangular steel strip rolled to form a hollow cylinder. One end of the cylinder is rigidly attached to the yoke pin while the coiled end is loosely centered around an extension of the link pin 154. In other embodiments, force generating device 170 may be implemented with a tension spring, pneumatic cylinder, or other suitable means for providing a constant force.

Figure 5A:
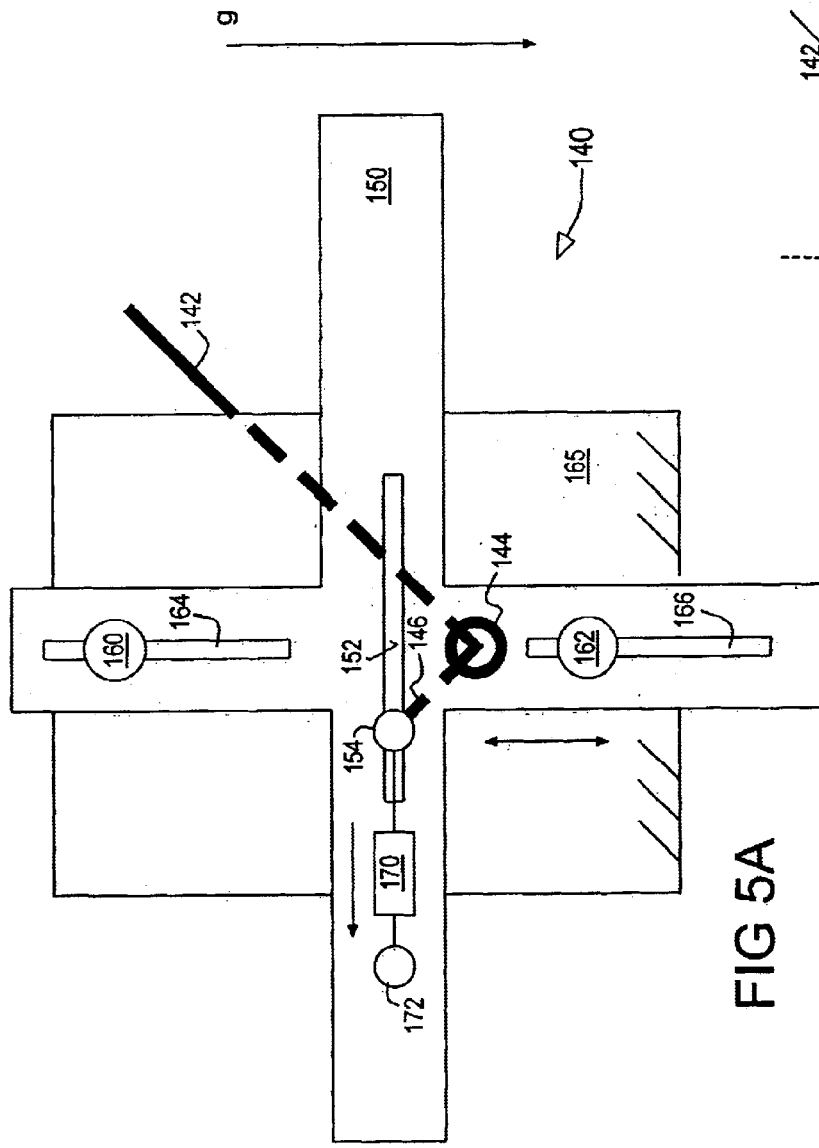
FIG. 5A illustrates selected elements of a counterbalance assembly according to a second embodiment of the invention.
Figure 5B:
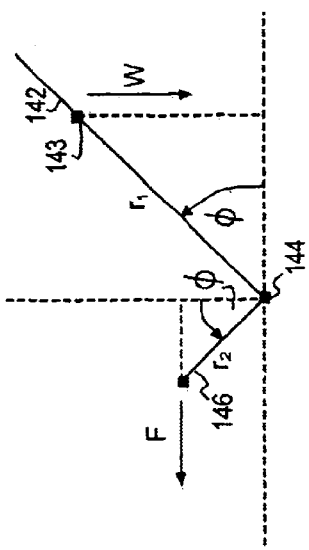
FIG. 5B is a graphical illustration of the prevailing forces in the assembly of FIG. 5B.

Referring now to FIGS. 5A and 5B, a second embodiment of assembly 140 is depicted. In this embodiment, the mechanical arm 142 and counterbalance extension link 146 are perpendicular to each other. This embodiment may be beneficial in reducing the total space required to implement the assembly or to provide flexibility to the design of a mechanical system that employs assembly 140. In any event the perpendicular orientation of counterbalance extension link 146 and mechanical arm 142 necessitates changes to the configuration of yoke 150. Specifically, as depicted in FIG. 5A, the depicted embodiment of yoke 150 includes a first slot 152 that is oriented perpendicular to the force of gravity as it acts on mechanical arm 142. Similarly force generating device 170 is connected between counterbalance extension link pin 154 and a yoke pin 172 and oriented to apply a horizontal force to counterbalance extension link pin 154. The second and third slots 164 and 166 of yoke 150 as depicted in FIG. 5A enable the yoke to translate in a vertical direction as mechanical arm 142 rotates about pivot point 144.

Referring to FIG. 5B, the graphical representation of the forces acting on the assembly show that the movements about pivot point 144 are $r_1 \cdot \cos(\phi) \cdot W$ and $r_2 \cdot \cos(\phi) \cdot F$, where F is the horizontally oriented force exerted on counterbalance extension link pin 154 by horizontally oriented force generating device 170. It will be observed that these equations are the same equations that applied to the collinear embodiment depicted in FIG. 4A. Thus, by altering the orientation of the force generating device 170 to coincide with the change in mechanical arm configuration, the same result (i.e., static equilibrium for all φ from 0° to 360°) is achieved.

In FIG. 7, a multiple-segment embodiment of assembly 140 is depicted to emphasize a scalable implementation of the present invention. In the multiple segment embodiment, two or more assemblies mechanical arms 142A and 142B are linked, with the pivot point 144B of second arm 142B being located on first arm 142A and so forth. Yokes 150A and 150B are used to maintain constant force on link pins 154A and 154B respectively in conjunction with a constant force mechanism. In some embodiments, each segment has its own constant force device such as the constant force spring described above. In the depicted embodiment, a counterbalanced multi-segment structure 140 is achieved using a single spring 171 connected to link pins 154A and 154B via fixed pins 172A and 172B. In this case, the single spring 171 applied the same constant force to link pins 154A and 154B. By adjusting the length of extension links 146A and 146B (i.e., the length of the corresponding $r_2$ values), the movements about pivot points 144A and 144B can be adjusted to counter balance the mechanical arms 142A and 142B. With each segment in static equilibrium about its corresponding pivot point, the entire structure is in static equilibrium about the original pivot point without regard to the rotational angle of any of the corresponding segments.

It will be apparent to those skilled in the art having the benefit of this disclosure that the present invention contemplates a counterbalanced arm mechanism. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A mechanical assembly, comprising:
   a first arm connected to and free to rotate about a pivot point;
   a counterbalance extension link connected to and free to rotate about the pivot point;
   a yoke including a first slot in which a pin of the counterbalance extension link resides, wherein the yoke is enabled to translate in a plane responsive to rotation of the counterbalance extension link pin about the pivot point; and
   a force generating device connected between the counterbalance extension link pin and a fixed point on the yoke to exert a force on the counterbalance extension link pin, wherein the orientation of the force produced by the force generating device remains constant as the yoke translates responsive to the counterbalance extension link pin rotating about the pivot point;
   wherein the yoke includes at least a second slot perpendicular to the first slot and a pin attached to a fixed reference through the second slot to guide the motion of the yoke as it translates.

2. The assembly of claim 1, wherein the counterbalance extension link and the first arm are collinear and the orientation of the first slot is parallel to the force of gravity.

3. The assembly of claim 1, wherein the force generating device is a constant force spring.

4. The assembly of claim 1, wherein the pivot point comprises a pin extending through a hole in the fixed reference and wherein the counterbalance extension link rotates about the pin on a first side the fixed reference and the arm rotates about the pivot point on a second side of the fixed reference.

5. The assembly of claim 1, wherein the counterbalance extension link and the first arm are perpendicular and the orientation of the fist slot is perpendicular to the force of gravity.

6. The assembly of claim 1, further comprising a second arm connected to and free to rotate about a second pivot point wherein the second pivot point is located on the first arm, a second counterbalance extension link connected to and free to rotate about the second pivot point, a second yoke enabled to translate in a plane responsive to rotation of the second extension link pin and a second force generating device to exert a counterbalancing force on the second link pin.

7. The assembly of claim 6, wherein the first and second force generating devices are provided by a single spring.

* * * * *